United States Patent [19]
Heimann

[11] 3,962,015
[45] June 8, 1976

[54] METHOD OF ASSEMBLING ROOF SHEETS TO ROOF BOWS

[75] Inventor: Fred G. Heimann, Mount Clemens, Mich.

[73] Assignee: Fruehauf Corporation, Detroit, Mich.

[22] Filed: Dec. 20, 1974

[21] Appl. No.: 534,800

[52] U.S. Cl. .............................. 156/295; 156/309; 427/300; 428/139
[51] Int. Cl.² ........................................ B23B 31/00
[58] Field of Search ........................... 156/307–309, 156/322, 295, 87, 90, 311, 498–499; 264/257; 427/300, 369–370, 375, 379, 388; 428/DIG. 920, 444, 138, 139, 244; 228/214, 222, 203–204

[56] References Cited
UNITED STATES PATENTS
| | | | |
|---|---|---|---|
| 2,650,185 | 8/1953 | Larson et al. | 156/313 X |
| 3,850,725 | 11/1974 | Spielau et al. | 156/306 |

FOREIGN PATENTS OR APPLICATIONS
| | | | |
|---|---|---|---|
| 128,465 | 7/1948 | Australia | 156/295 |

Primary Examiner—William A. Powell
Assistant Examiner—David A. Simmons
Attorney, Agent, or Firm—Snyder, Brown and Ramik

[57] ABSTRACT

In the making of vehicle bodies such as truck and trailer bodies, the roof sheets are secured to the roof bows by means of a hot melt adhesive. Premature cooling of the adhesive which otherwise does not allow sufficient time to position the roof sheet and then mate it with the roof bows properly after the adhesive is applied, is prevented by employing a heat-insulating layer of glass fiber scrim cloth on the roof bows and upon which the hot melt adhesive is applied. Temporary clamping pressure forces the hot melt adhesive through the pores of the scrim cloth and into contact with the roof bows whereupon it rapidly cools and sets. The presence of the scrim cloth provides a substantial increase in the otherwise unacceptably low bonding strength of the hot melt adhesive.

6 Claims, 6 Drawing Figures

U.S. Patent  June 8, 1976  3,962,015
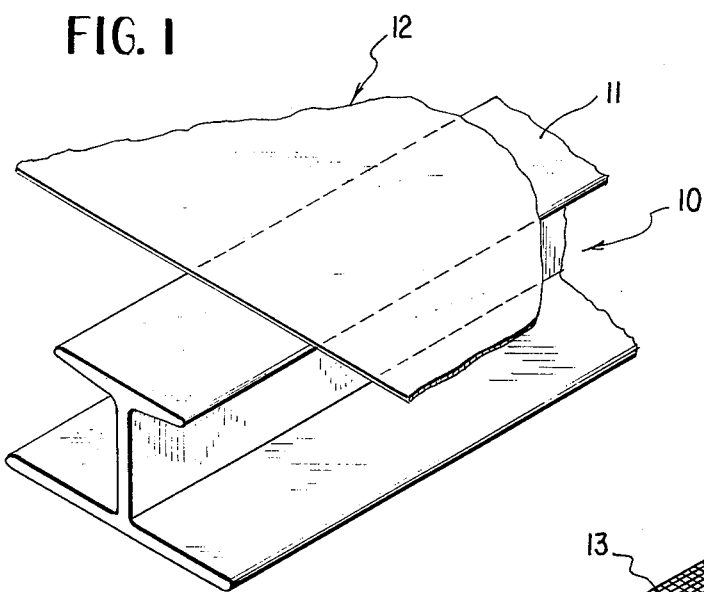
FIG. 1
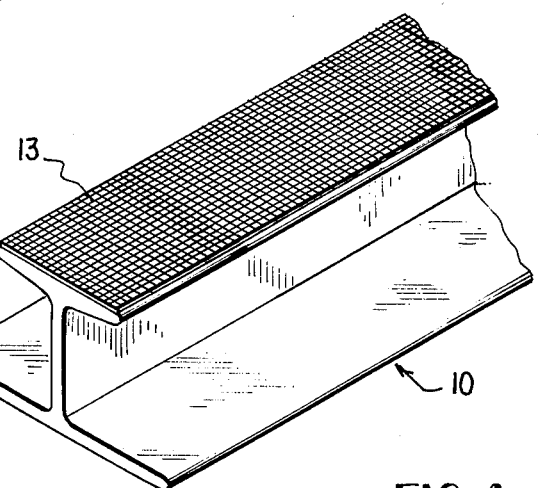
FIG. 2
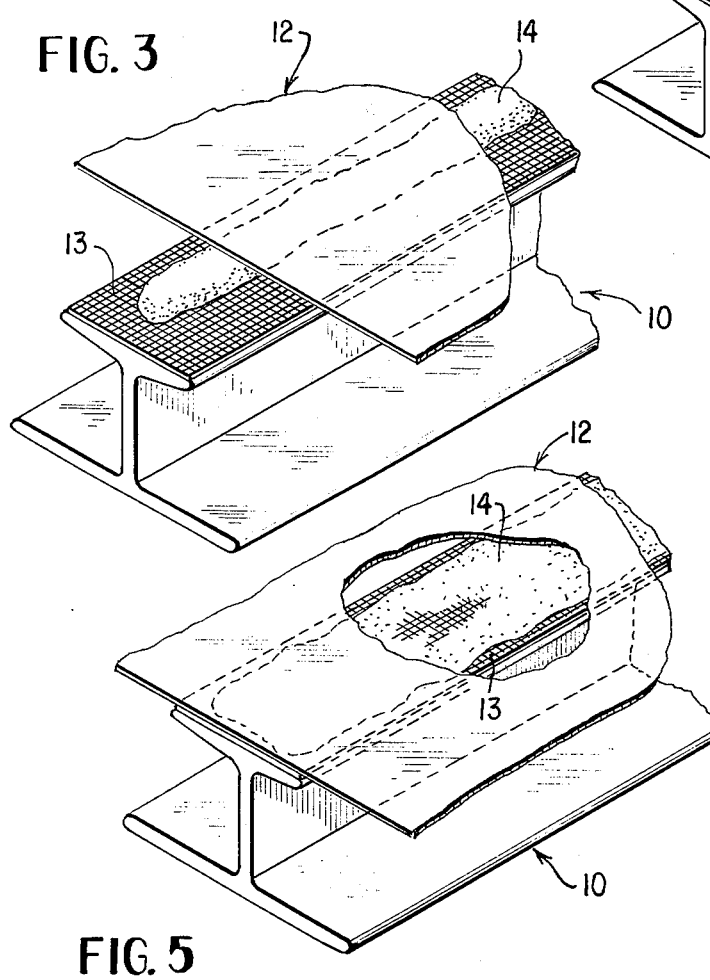
FIG. 3
FIG. 5
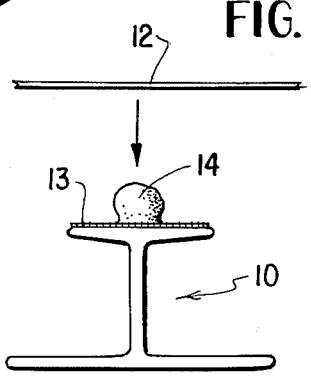
FIG. 4
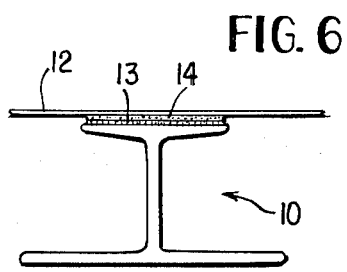
FIG. 6

METHOD OF ASSEMBLING ROOF SHEETS TO ROOF BOWS

BACKGROUND OF THE INVENTION

In making vehicle bodies and in particular truck trailer bodies, the older practice of securing the roof sheets to the roof bows by means of fastening elements such as rivets has been supplanted by the use of heat curable adhesives. Various heat curable adhesives possess sufficient bonding strength as provides an adequate securing of the roof sheet to the roof bows but the technique requires the parts to be held in clamped, assembled condition while being subjected to the heat-curing cycle, typically a cycle involving approximately 20 minutes at 180°F. Obviously, such a process is time consuming and requires a complex clamping arrangement and it would be advantageous to obtain a more simple and less time consuming process.

To this end, it has been proposed to utilize a hot melt adhesive to replace the heat-cured adhesive but two problems are presented by the use of hot melt adhesives. First of all, commercially available hot melt adhesives have proven to provide an unacceptably low bonding strength between the roof bows, conventionally aluminum structural members, and the aluminum roof sheets and, further, unless the roof bows are subjected to a preheating cycle to raise their temperature to 150-200°F, the hot melt adhesive cools and sets too rapidly once applied to the roof bows as does not allow adequate time in which to place the roof sheet in position and press it against the roof bows to spread the adhesive. For example, with the roof bows at room temperature it has been found that after the hot melt adhesive has been applied there is not more than about 5-10 seconds available within which to bring the roof sheet into proper position and to press it against the roof bows. Moreover, as noted above, the resultant structure does not possess adequate bonding strength.

BRIEF SUMMARY OF THE INVENTION

It has been found that the two problems associated with hot melt adhesives, as specified above, are overcome if a layer of porous, heat insulating material is placed on the bonding surfaces of the roof bows before the hot melt adhesive is applied. Preferably such material is a glass fiber scrim cloth strip. Now when the hot melt adhesive is applied at its normal application temperature (typically 300°-400°F) such that it lays as a bead of toothpaste-like fluidity on the scrim cloth, the heat insulating effect of the porous material is such that there will be available at least about 60 seconds in which to bring the roof sheet into proper position and to press it against the roof bows. As soon as the cool roof sheet contacts the adhesive and forces it through the pores or openings of the scrim cloth and into contact with the cool bonding surface of the roof bows, the adhesive rapidly cools and sets. Moreover, it has been found that the bond resulting between the roof sheet and roof bows is increased to such an extent due to the presence of the heat-insulating material that the bond strength is adequate to prevent structural failure of the bond which otherwise has been found to occur with this type of adhesive.

BRIEF DESCRIPTION OF THE DRAWING FIGURES

FIG. 1 is a perspective view of a roof bow structural member and a roof sheet prior to being assembled;

FIG. 2 is a view similar to FIG. 1 but showing a layer of scrim cloth applied to the bonding surface of the roof bow;

FIG. 3 is a view similar to FIG. 2 but showing a bead of hot melt adhesive laying upon the layer of scrim cloth;

FIG. 4 is an end elevational view of the assembly shown in FIG. 3;

FIG. 5 is a perspective view partly broken away illustrating the roof sheet in contact with an pressed against he roof bow; and FIG. 6 is an end elevational view showing the completed structural assembly.

DETAILED DESCRIPTION OF THE INVENTION

With reference to FIG. 1, the reference character 10 indicates generally a roof bow of a truck trailer body which typically is an aluminum structural member of standard structural beam form and presenting on its upper surface a bonding surface indicated by the reference character 11. In fabricating the vehicle body, several such roof bows are disposed in relatively fixed relationship with respect to each other and an aluminum roof sheet indicated generally by the reference character 12 is positioned in spaced relationship above these roof bows and ultimately lowered into contact with the bonding surfaces 11 and clamped thereagainst firmly to hold the roof sheet against the various roof bows when a conventional heat-curable adhesive is employed on the bonding surfaces 11 of the roof bows. Then the entire assembly while being held tightly clamped is subjected to a heat curing cycle whereafter the assembly is allowed to cool and the clamping means removed. If a hot melt adhesive were to be used in bonding the roof sheet 12 to the roof bows 10, beads of the hot melt adhesive would be applied to the bonding surfaces 11 of the various roof bows with the roof sheet 12 removed to a more remote position to allow clearance for the proper application of the hot melt adhesive and then the roof sheet would be positioned essentially as in shown in FIG. 1, that is in proper or substantially proper orientation relative to the roof bows 10 and then the roof sheet would be pressed downwardly while in this proper relative position against the roof bows. As stated hereinabove, unless the roof bows 10 are preheated so that is hot melt adhesive does not cool too rapidly when laid upon the bonding surfaces 11, the hot melt adhesive will cool and set so rapidly after it has been laid onto the cool bonding surface 11 that insufficient time is available properly to position the roof sheet as in FIG. 1 and then press it downwardly against the roof bows. In any event, as has been set forth hereinabove, the resultant bonding strength achieved between the roof bows 10 and the roof sheet 12 due to the presence of the hot melt adhesive is not sufficient for the purposes intended.

To avoid these problems and to eliminate the necessity for preheating the roof bows, a strip of porous, heat insulating material 13 is placed over the bonding surface 11 of the roof bow as is shown in FIG. 2 and then a bead of hot melt adhesive is applied as indicated at 14 in FIG. 3 whereafter the roof sheet 12 is positioned in spaced relation above the roof bow or roof bows 10 in essentially the proper orientation relative thereto as is shown in FIGS. 3 and 4 whereafter the roof sheet 12 is pressed downwardly as indicated by the arrow in FIG. 4 to sandwich the bead of adhesive 14 and the scrim cloth 13 firmly between the roof sheet and the roof bow whereby the still fluid bead of adhesive 14 is flattened as indicated in FIG. 5 while being forced through the pores of the scrim cloth 13 and into contact with the bonding surface 11 of the roof bows. The hot melt adhesive is applied at a temperature which gives it a toothpaste-like fluidity when applied and a porosity or weave of the scrim cloth 13 is such as does not permit, at this fluidity of the hot melt adhesive, any significant penetration of the hot melt adhesive into the scrim cloth and especially into contact with the bonding surface 11. By following this technique, there will be at least about 60 seconds available after the bead of hot melt adhesive is applied on the scrim cloth 13 to allow the proper positioning of the roof sheet as in FIG. 3 and to press it then downwardly into final position as is illustrated in FIG. 5. The final form of the assembly, as is shown in FIG. 6, has been found to possess substantially greater bonding strength between the roof bow 10 and the roof sheet 12 due to the presence of the strip of scrim cloth 13 interposed between the two. Once the parts are pressed together the hot melt adhesive cools rapidly to set condition, typically within a few seconds, and the clamping pressure may thereafter be released and the assembly subjected to further handling as may be necessary.

In one illustrative embodiment of the invention, the scrim cloth is of woven glass fiber construction having an approximate weight of 6 oz. per yard with thirty-two glass fiber warp yarns per inch of fabric width woven with sixteen picks per inch of glass fiber filler yarn; the hot melt adhesive is Shell Kraton applied at a temperature of 350°F.

The scrim cloth may be woven or non-woven, an example of the latter being porous, open cell urethane flexible foam strip of 1/16 inch thickness.

Typical hot melt adhesives are polybutadiene elastomers, polyisoprene-styrene copolymers, polyester elastomers and the like such as Shell Kraton, duPont Hytrel and Uniroyal TPR, applied at a temperature of about 350°F and having a maximum viscosity of 20,000 c.p.s.

What is claimed herein is:

1. The method of assembling and joining structural metal members in a desired relative orientation with respect to each other which comprises the steps of:
   a. positioning a first structural metal member to place at least one bonding surface thereof in upwardly facing accessible location;
   b. heat insulating said bonding surface by placing a layer of porous heat insulating material thereon;
   c. applying a hot melt adhesive to said layer of heat insulating material, said adhesive being at a temperature sufficient to render it fluid without significant penetration through said porous material;
   d. positioning a second structural metal member in spaced relation to said bonding surface and at least approximately in said desired relative orientation of the second member with respect to said first member; and then
   e. pressing the two members together in said desired relative orientation before said adhesive cools and loses its fluidity and with force sufficient to penetrate said adhesive through said porous material and into contact with said bonding surface.

2. The method according to claim 1 werein said heat insulating material is of open weave, cloth-like form.

3. The method according to claim 2 wherein said heat insulating material is a glass fiber cloth.

4. In the making of vehicle bodies, the method of joining metal roof sheets in proper position relative to metal roof bows which comprises the steps of:
   a. assembling a plurality of metal roof bows in final fixed position relative to each other, each roof bow having a bonding surface to which the roof sheet ultimately is to be joined;
   b. heat insulating each bonding surface by placing a layer of porous heat insulating material on each bonding surface;
   c. applying a bead of hot melt adhesive on each of said layers of heat insulating material, said adhesive being at a temperature sufficient to render it fluid for an extended time but of insufficient fluidity significantly to penetrate through said porous material; and then within said extented time
   d. positioning said metal roof sheet over said roof bows and pressing said roof sheet and said roof bows together in said proper relative position with a force sufficient tightly to sandwich the porous material between the roof sheet and roof bows and to penetrate said adhesive through said porous material and into contact with said bonding surface.

5. The method according to claim 4 wherein said heat insulating material is of open weave, cloth-like form.

6. The method according to claim 5 wherein said heat insulating material is a glass fiber cloth.

* * * * *